US012584072B2

(12) United States Patent
Bhattacharya et al.

(10) Patent No.: US 12,584,072 B2
(45) Date of Patent: Mar. 24, 2026

(54) PROCESS AND SYSTEM FOR BASE OIL PRODUCTION

(71) Applicant: CHEVRON U.S.A. INC., San Ramon, CA (US)

(72) Inventors: Subhasis Bhattacharya, San Ramon, CA (US); Yihua Zhang, Albany, CA (US); Guan-Dao Lei, Walnut Creek, CA (US); Ajit R. Pradhan, San Ramon, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/042,724

(22) PCT Filed: Aug. 30, 2021

(86) PCT No.: PCT/US2021/048167
§ 371 (c)(1),
(2) Date: Feb. 23, 2023

(87) PCT Pub. No.: WO2022/047282
PCT Pub. Date: Mar. 3, 2022

(65) Prior Publication Data
US 2023/0348798 A1 Nov. 2, 2023

Related U.S. Application Data

(60) Provisional application No. 63/072,628, filed on Aug. 31, 2020.

(51) Int. Cl.
| | |
|---|---|
| *C10G 45/62* | (2006.01) |
| *B01J 29/74* | (2006.01) |
| *C10G 45/64* | (2006.01) |
| *C10G 65/04* | (2006.01) |

(52) U.S. Cl.
CPC .............. *C10G 45/62* (2013.01); *B01J 29/74* (2013.01); *C10G 45/64* (2013.01); *C10G 65/043* (2013.01); *C10G 2300/302* (2013.01); *C10G 2300/304* (2013.01); *C10G 2400/10* (2013.01)

(58) Field of Classification Search
CPC .. C07K 14/415; C12N 15/8282; A01N 43/16; C12Q 1/6897; B01J 29/74; A01H 1/1255; C10G 2300/302; C10G 2300/304; C10G 2400/10; C10G 45/62; C10G 45/64; C10G 65/043
See application file for complete search history.

(56) References Cited

U.S. PATENT DOCUMENTS

| | | | |
|---|---|---|---|
| 3,852,207 | A | 12/1974 | Stangeland |
| 4,673,487 | A | 6/1987 | Miller |
| 5,135,638 | A | 8/1992 | Miller |
| 5,282,958 | A | 2/1994 | Santilli |
| 6,790,433 | B2 | 9/2004 | Chen |
| 7,282,134 | B2 | 10/2007 | Abernathy |
| 7,390,763 | B2 | 6/2008 | Zones |
| 7,468,126 | B2 | 12/2008 | Zones |
| 8,790,507 | B2 | 7/2014 | Krishna |
| 9,677,016 | B2 | 6/2017 | Krishna |
| 9,802,830 | B2 | 10/2017 | Ojo |
| 9,920,260 | B2 | 3/2018 | Ojo |
| 2007/0048214 | A1* | 3/2007 | Zones ..................... C01B 39/48 |
| | | | 502/64 |
| 2009/0166252 | A1* | 7/2009 | Daage .................. C10G 65/043 |
| | | | 208/89 |
| 2010/0147747 | A1* | 6/2010 | Elia .......................... B01J 29/80 |
| | | | 502/67 |
| 2011/0315598 | A1 | 12/2011 | Krishna |
| 2011/0319685 | A1 | 12/2011 | Krishna |
| 2016/0177204 | A1 | 6/2016 | Wedlock |
| 2017/0056868 | A1 | 3/2017 | Ojo |
| 2017/0056870 | A1* | 3/2017 | Ojo ..................... B01J 29/7461 |
| 2017/0066979 | A1 | 3/2017 | Lei |

FOREIGN PATENT DOCUMENTS

| | | |
|---|---|---|
| JP | 2011508049 A | 3/2011 |
| JP | 2012512271 A | 5/2012 |
| JP | 2013516548 A | 5/2013 |
| JP | 2018531864 A | 11/2018 |
| JP | 2020504698 A | 2/2020 |
| RU | 2493236 C2 | 9/2013 |
| RU | 2501843 C2 | 12/2013 |
| WO | 2012005981 A2 | 1/2012 |
| WO | 2017034823 A1 | 3/2017 |
| WO | 2018093511 A1 | 5/2018 |

OTHER PUBLICATIONS

"Group notation revised in periodic table." Chemical & Engineering News Archive, 63(5), Feb. 4, 1985, p. 26-27.
PCT International Search Report and Written Opinion mailed on Nov. 22, 21, issued in International Application No. PCT/US2021/048167, filed on Aug. 30, 21, 17 pages.

* cited by examiner

*Primary Examiner* — Ellen M McAvoy
*Assistant Examiner* — Chantel Graham
(74) *Attorney, Agent, or Firm* — Mark Warzel

(57) ABSTRACT

An improved process and catalyst system for making a base oil product and for improving base oil cloud point and pour point characteristics, while also providing good product yields. The process and catalyst system generally involves the use of a layered catalyst system comprising an SSZ-91 catalyst and an SSZ-32X catalyst arranged to sequentially contact a hydrocarbon feedstock with both catalysts and thereby provide dewaxed base oil products.

22 Claims, No Drawings

PROCESS AND SYSTEM FOR BASE OIL PRODUCTION

CROSS REFERENCE TO RELATED APPLICATIONS

This application is the national stage application of International Appl. No. PCT/US2021/048167, filed on 30 Aug. 2021, and is related to, and claims the benefit of priority to U.S. Provisional Patent Appl. Ser. No. 63/072,628, filed on 30 Aug. 2020, entitled "PROCESS AND SYSTEM FOR BASE OIL PRODUCTION", the disclosures of which are herein incorporated by reference in their entirety.

FIELD OF THE INVENTION

A process and system for producing base oils from hydrocarbon feedstocks using a layered catalyst system.

BACKGROUND OF THE INVENTION

A hydroisomerization catalytic dewaxing process for the production of base oils from a hydrocarbon feedstock involves introducing the feed into a reactor containing a dewaxing catalyst system with the presence of hydrogen. Within the reactor, the feed contacts the hydroisomerization catalyst under hydroisomerization dewaxing conditions to provide an isomerized stream. Hydroisomerization removes aromatics and residual nitrogen and sulfur and isomerize the normal paraffins to improve the cold properties. The isomerized stream may be further contacted in a second reactor with a hydrofinishing catalyst to remove traces of any aromatics, olefins, improve color, and the like from the base oil product. The hydrofinishing unit may include a hydrofinishing catalyst comprising an alumina support and a noble metal, typically palladium, or platinum in combination with palladium.

Typically, dewaxing processes for making both light and heavy base oil products may be conducted by cofeeding light and heavy feeds. In typical hydroisomerization catalytic dewaxing processes, however, the operating temperature has to be raised sufficiently to meet the very low pour/cloud point specification for the dewaxed light product. Under such conditions, the heavy fraction is typically overdewaxed, causing a loss in yield due to the production of lower molecular weight hydrocarbons, such as middle distillates and even lighter $C_4$ products. Accordingly, a need exists for processes and catalyst systems to produce base oil products having improved cloud point and pour point characteristics, while also providing good product yield for light, heavy, and total base oil product production.

SUMMARY OF THE INVENTION

This invention relates to processes and catalyst systems for converting wax-containing hydrocarbon feedstocks into high-grade products, including base oils generally having a reduced pour point and/or a reduced cloud point, while also providing a high viscosity index (VI). Such processes employ a layered catalyst system comprising a plurality of hydroisomerization dewaxing catalysts. The hydroisomerization process converts aliphatic, unbranched paraffinic hydrocarbons (n-paraffins) to isoparaffins and cyclic species, thereby decreasing the pour point and cloud point of the base oil product as compared with the feedstock.

In one aspect, the present invention is directed to a hydroisomerization process, which is useful to make dewaxed products including base oils, particularly base oil products of one or more product grades through hydroprocessing of a suitable hydrocarbon feedstream. While not necessarily limited thereto, one of the goals of the invention is to provide improved cloud and/or pour points of base oil products while also providing good base oil product yields. The process generally comprises contacting a hydrocarbon feed with a first hydroisomerization catalyst under first hydroisomerization conditions to produce a first product or product stream; wherein, the first hydroisomerization catalyst comprises an SSZ-91 molecular sieve comprising at least one modifying metal selected from Groups 7 to 10 and 14 of the Periodic Table; and contacting the first product with a second hydroisomerization catalyst under second hydroisomerization conditions to produce a second product or product stream; wherein, the second hydroisomerization catalyst comprises an SSZ-32x molecular sieve comprising at least one modifying metal selected from Groups 7 to 10 and 14 of the Periodic Table.

The invention is also directed to a hydroisomerization catalyst system comprising the first and second hydroisomerization catalysts used in the process described herein. The first catalyst in the system generally comprises about 0.01 to 5.0 wt. % of the modifying metal, about 1 to 99 wt. % of a matrix material, and about 0.1 to 99 wt. % of the SSZ-91 molecular sieve, or about 0.01 to 5.0 wt. % of the modifying metal, about 1 to 80 wt. % of a matrix material, and about 5.0 to 85 wt. %, or about 15 to 75 wt. % of the SSZ-91 molecular sieve.

DETAILED DESCRIPTION

Although illustrative embodiments of one or more aspects are provided herein, the disclosed processes may be implemented using any number of techniques. The disclosure is not limited to the illustrative or specific embodiments, drawings, and techniques illustrated herein, including any exemplary designs and embodiments illustrated and described herein, and may be modified within the scope of the appended claims along with their full scope of equivalents.

Unless otherwise indicated, the following terms, terminology, and definitions are applicable to this disclosure. If a term is used in this disclosure but is not specifically defined herein, the definition from the IUPAC Compendium of Chemical Terminology, 2nd ed (1997), may be applied, provided that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein is to be understood to apply.

"API gravity" refers to the gravity of a petroleum feedstock or product relative to water, as determined by ASTM D4052-11.

"ISO-VG" refers to the viscosity classification that is recommended for industrial applications, as defined by 1503448:1992.

"Viscosity index" (VI) represents the temperature dependency of a lubricant, as determined by ASTM D2270-10 (E2011).

"Vacuum gas oil" (VGO) is a byproduct of crude oil vacuum distillation that can be sent to a hydroprocessing unit or to an aromatic extraction for upgrading into base oils.

VGO generally comprises hydrocarbons with a boiling range distribution between 343° C. (649° F.) and 538° C. (1000° F.) at 0.101 MPa.

"Treatment," "treated," "upgrade," "upgrading" and "upgraded," when used in conjunction with an oil feedstock, describes a feedstock that is being or has been subjected to hydroprocessing, or a resulting material or crude product, having a reduction in the molecular weight of the feedstock, a reduction in the boiling point range of the feedstock, a reduction in the concentration of asphaltenes, a reduction in the concentration of hydrocarbon free radicals, and/or a reduction in the quantity of impurities, such as sulfur, nitrogen, oxygen, halides, and metals.

"Hydroprocessing" refers to a process in which a carbonaceous feedstock is brought into contact with hydrogen and a catalyst, at a higher temperature and pressure, for the purpose of removing undesirable impurities and/or converting the feedstock to a desired product. Examples of hydroprocessing processes include hydrocracking, hydrotreating, catalytic dewaxing, and hydrofinishing.

"Hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins (naphthenes) into non-cyclic branched paraffins.

"Hydrotreating" refers to a process that converts sulfur and/or nitrogen-containing hydrocarbon feeds into hydrocarbon products with reduced sulfur and/or nitrogen content, typically in conjunction with hydrocracking, and which generates hydrogen sulfide and/or ammonia (respectively) as byproducts. Such processes or steps performed in the presence of hydrogen include hydrodesulfurization, hydrodenitrogenation, hydrodemetallation, and/or hydrodearomatization of components (e.g., impurities) of a hydrocarbon feedstock, and/or for the hydrogenation of unsaturated compounds in the feedstock. Depending on the type of hydrotreating and the reaction conditions, products of hydrotreating processes may have improved viscosities, viscosity indices, saturates content, low temperature properties, volatilities and depolarization, for example. The terms "guard layer" and "guard bed" may be used herein synonymously and interchangeably to refer to a hydrotreating catalyst or hydrotreating catalyst layer. The guard layer may be a component of a catalyst system for hydrocarbon dewaxing, and may be disposed upstream from at least one hydroisomerization catalyst.

"Catalytic dewaxing", or hydroisomerization, refers to a process in which normal paraffins are isomerized to their more branched counterparts by contact with a catalyst in the presence of hydrogen.

"Hydrofinishing" refers to a process that is intended to improve the oxidation stability, UV stability, and appearance of the hydrofinished product by removing traces of aromatics, olefins, color bodies, and solvents. UV stability refers to the stability of the hydrocarbon being tested when exposed to UV light and oxygen. Instability is indicated when a visible precipitate forms, usually seen as Hoc or cloudiness, or a darker color develops upon exposure to ultraviolet light and air. A general description of hydrofinishing may be found in U.S. Pat. Nos. 3,852,207 and 4,673,487.

The term "Hydrogen" or "hydrogen" refers to hydrogen itself, and/or a compound or compounds that provide a source of hydrogen.

"Cut point" refers to the temperature on a True Boiling Point (TBP) curve at which a predetermined degree of separation is reached.

"Pour point" refers to the temperature at which an oil will begin to flow under controlled conditions. The pour point may be determined by, for example, ASTM D5950.

"Cloud point" refers to the temperature at which a lube base oil sample begins to develop a haze as the oil is cooled under specified conditions. The cloud point of a lube base oil is complementary to its pour point. Cloud point may be determined by, for example, ASTM D5773.

"TBP" refers to the boiling point of a hydrocarbonaceous feed or product, as determined by Simulated Distillation (SimDist) by ASTM D2887-13.

"Hydrocarbonaceous", "hydrocarbon" and similar terms refer to a compound containing only carbon and hydrogen atoms. Other identifiers may be used to indicate the presence of particular groups, if any, in the hydrocarbon (e.g., halogenated hydrocarbon indicates the presence of one or more halogen atoms replacing an equivalent number of hydrogen atoms in the hydrocarbon).

The term "Periodic Table" refers to the version of the IUPAC Periodic Table of the Elements dated Jun. 22, 2007, and the numbering scheme for the Periodic Table Groups is as described in Chem. Eng. News, 63(5), 26-27 (1985). "Group 2" refers to IUPAC Group 2 elements, e.g., magnesium, (Mg), Calcium (Ca), Strontium (Sr), Barium (Ba) and combinations thereof in any of elemental, compound, or ionic form. "Group 7" refers to IUPAC Group 7 elements, e.g., manganese (Mn), rhenium (Re) and combinations thereof in their elemental, compound, or ionic form. "Group 8" refers to IUPAC Group 8 elements, e.g., iron (Fe), ruthenium (Ru), osmium (Os) and combinations thereof in their elemental, compound, or ionic form. "Group 9" refers to IUPAC Group 9 elements, e.g., cobalt (Co), rhodium (Rh), iridium (Ir) and combinations thereof in any of elemental, compound, or ionic form. "Group 10" refers to IUPAC Group 10 elements, e.g., nickel (Ni), palladium (Pd), platinum (Pt) and combinations thereof in any of elemental, compound, or ionic form. "Group 14" refers to IUPAC Group 14 elements, e.g., germanium (Ge), tin (Sn), lead (Pb) and combinations thereof in any of elemental, compound, or ionic form.

The term "support", particularly as used in the term "catalyst support", refers to conventional materials that are typically a solid with a high surface area, to which catalyst materials are affixed. Support materials may be inert or participate in the catalytic reactions, and may be porous or non-porous. Typical catalyst supports include various kinds of carbon, alumina, silica, and silica-alumina, e.g., amorphous silica aluminates, zeolites, alumina-boria, silica-alumina-magnesia, silica-alumina-titania and materials obtained by adding other zeolites and other complex oxides thereto.

"Molecular sieve" refers to a material having uniform pores of molecular dimensions within a framework structure, such that only certain molecules, depending on the type of molecular sieve, have access to the pore structure of the molecular sieve, while other molecules are excluded, e.g., due to molecular size and/or reactivity. The term "molecular sieve" and "zeolite" are synonymous and include (a) intermediate and (b) final or target molecular sieves and molecular sieves produced by (1) direct synthesis or (2) post-crystallization treatment (secondary modification). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433. Zeolites, crystalline aluminophosphates and crystalline silicoaluminophosphates are representative examples of molecular sieves.

In this disclosure, while compositions and methods or processes are often described in terms of "comprising" various components or steps, the compositions and methods may also "consist essentially of" or "consist of" the various components or steps, unless stated otherwise.

The terms "a," "an," and "the" are intended to include plural alternatives, e.g., at least one. For instance, the disclosure of "a transition metal" or "an alkali metal" is meant to encompass one, or mixtures or combinations of more than one, transition metal or alkali metal, unless otherwise specified.

All numerical values within the detailed description and the claims herein are modified by "about" or "approximately" the indicated value, and take into account experimental error and variations that would be expected by a person having ordinary skill in the art.

In one aspect, the present invention is a hydroisomerization process, useful to make dewaxed products including base oils, the process comprising contacting a hydrocarbon feed with a first hydroisomerization catalyst under first hydroisomerization conditions to produce a first product; wherein, the first hydroisomerization catalyst comprises an SSZ-91 molecular sieve comprising at least one modifying metal selected from Groups 7 to 10 and 14 of the Periodic Table; and contacting the first product with a second hydroisomerization catalyst under second hydroisomerization conditions to produce a second product; wherein, the second hydroisomerization catalyst comprises an SSZ-32x molecular sieve comprising at least one modifying metal selected from Groups 7 to 10 and 14 of the Periodic Table.

The SSZ-91 molecular sieve used in the first hydroisomerization catalyst is described in, e.g., U.S. Pat. Nos. 9,802,830; 9,920,260; 10,618,816; and in WO2017/034823. The SSZ-91 molecular sieve generally comprises ZSM-48 type zeolite material, the molecular sieve having at least 70% polytype 6 of the total ZSM-48-type material; an EUO-type phase in an amount of between 0 and 3.5 percent by weight; and polycrystalline aggregate morphology comprising crystallites having an average aspect ratio of between 1 and 8. The silicon oxide to aluminum oxide mole ratio of the SSZ-91 molecular sieve may be in the range of 40 to 220 or 50 to 220 or 40 to 200. The foregoing noted patent provide additional details concerning SSZ-91 sieves, methods for their preparation, and catalysts formed therefrom.

The SSZ-32X molecular sieve used in the second hydroisomerization catalyst is described in, e.g., U.S. Pat. Nos. 7,390,763; 7,468,126; 8,790,507; 9,677,016; and in WO2012/005981; WO2018/093511. The SSZ-32X molecular sieve generally comprises small crystals and is an intermediate pore size zeolite.

Each of the first and second catalysts comprise active metals selected from Groups 7 to 10 and Group 14 metals of the Periodic Table. The first (SSZ-91) catalyst may advantageously comprise a first Group 10 metal and, optionally, a second metal selected from Groups 7 to 10 and Group 14 metals of the Periodic Table. The Group 10 metal may be, e.g., platinum, palladium or a combination thereof, and optionally with nickel. Platinum is a suitable by itself in some aspects. While not limited thereto, the Groups 7 to 10 and Group 14 metal may be more narrowly selected from Pt, Pd, Ni, Re, Ru, Ir, Sn, or a combination thereof. The second metal may also be more narrowly selected from the second Groups 7 to 10 and Group 14 metal is selected from Pd, Ni, Re, Ru, Ir, Sn, or a combination thereof. In a more specific instance, the first catalyst may comprise Pt as a Group 10 metal in an amount of 0.01-1.0 wt. % or 0.3-1.0 wt. % and a second metal selected from Pd, Ni, Re, Ru, Ir, Sn, or a combination thereof as a Groups 7 to 10 and Group 14 metal in an amount of 0.01-1.5 wt. %, or 0.03-0.8 wt. %.

The second (SSZ-32X) catalyst may also advantageously comprise a first Group 10 metal and, optionally, a second metal selected from Groups 7 to 10 and Group 14 metals of the Periodic Table. The second catalyst may also comprise a Group 2 metal as noted herein in addition to the first metal, such as a Group 10 metal, and the optional second metal. The Group 10 metal may be, e.g., platinum, palladium or a combination thereof, and optionally with nickel and/or a Group 2 metal. Platinum is a suitable by itself in some aspects, or in combination with a Group 2 metal such as magnesium. While not limited thereto, the Groups 7 to 10 and Group 14 metal may be more narrowly selected from Pt, Pd, Ni, Re, Ru, Ir, Sn, or a combination thereof. The second metal may also be more narrowly selected from the second Groups 7 to 10 and Group 14 metal is selected from Pd, Ni, Re, Ru, Ir, Sn, or a combination thereof.

The metals content in the first and second catalyst may be varied over typically useful ranges, e.g., the modifying metals content for the first and/or second catalyst may be 0.01-5.0 wt. % or 0.01-2.0 wt. %, or 0.1-2.0 wt. % (total catalyst weight basis). In some instances, the first and/or second catalyst comprises 0.01-1.0 wt. % Pt as one of the modifying metals and 0.01-1.5 wt. % of a second metal selected from Groups 7 to 10 and Group 14, or 0.3-1.0 wt. % Pt and 0.03-1.0 wt. % second metal, or 0.3-1.0 wt. % Pt and 0.03-0.8 wt. % second metal. In some cases, the ratio of the first Group 10 metal to the optional second metal selected from Groups 7 to 10 and Group 14 may be in the range of 10:1 to 1:5, or 3:1 to 1:3, or 1:1 to 1:2.

The first catalyst and the second catalyst may further comprise a matrix material selected from alumina, silica, titania or a combination thereof. In specific more cases, the first catalyst comprises 0.01 to 5.0 wt. % of the modifying metal, 1 to 99 wt. % of the matrix material, and 0.1 to 99 wt. % of the SSZ-91 molecular sieve and/or the weight ratio of the first isomerization catalyst to the second isomerization catalyst is about 10:1 to 1:10 or 4:1 to 1:4 or 1:1.

The hydrocarbon feed generally may be selected from a variety of base oil feedstocks, and advantageously comprises gas oil; vacuum gas oil; long residue; vacuum residue; atmospheric distillate; heavy fuel; oil; wax and paraffin; used oil; deasphalted residue or crude; charges resulting from thermal or catalytic conversion processes; shale oil; cycle oil; animal and vegetable derived fats, oils and waxes; petroleum and slack wax; or a combination thereof. The hydrocarbon feed may also comprise a feed hydrocarbon cut in the distillation range from 400-1300° F., or 500-1100° F., or 600-1050° F., and/or wherein the hydrocarbon feed has a KV100 (kinematic viscosity at 100° C.) range from about 3 to 30 cSt or about 3.5 to 15 cSt.

In some cases, the ratio of the dewaxing carried out by the first and second catalysts may be varied over broad ranges, e.g., the process and layered catalyst system may be used to hydrodewax 50-90% of the feedstock is hydrodewaxed by the first catalyst and/or about 20% or greater of the feedstock is hydrodewaxed by the second catalyst.

The first and/or second products, or product streams, may be used to produce one or more base oil products, e.g., to produce multiple grades having a KV100 in the range of about 2 to 30 cSt. Such base oil products may comprise a base oil product having a pour point of not more than about −12° C., and a base oil product having a pour point of not more than about −35° C., and/or wherein the base oil products comprise a base oil product having a viscosity in the range of 6-26 cSt at 100° C. and a base oil product having a viscosity in the range of 1.5-5 cSt at 100° C., or 2-3 cSt at 100° C.

The process and system may also be combined with additional process steps, or system components, e.g., the feedstock may be further subjected to hydrotreating conditions with a hydrotreating catalyst prior to contacting the hydrocarbon feed with the first hydroisomerization catalyst, optionally, wherein the hydrotreating catalyst comprises a guard layer catalyst comprising a refractory inorganic oxide material containing about 0.1 to 1 wt. % Pt and about 0.2 to 1.5 wt. % Pd.

Among the advantages provided by the present process and catalyst, are the reduction in the cloud point and/or pour point of the product produced using the layered system, as compared with the same process that differs only in that the layered catalyst system is not used, i.e., wherein only the first or the second catalyst is used.

In practice, hydrodewaxing is used primarily for reducing the pour point and/or for reducing the cloud point of the base oil by removing wax from the base oil. Typically, dewaxing uses a catalytic process for processing the wax, with the dewaxer feed is generally upgraded prior to dewaxing to increase the viscosity index, to decrease the aromatic and heteroatom content, and to reduce the amount of low boiling components in the dewaxer feed. Some dewaxing catalysts accomplish the wax conversion reactions by cracking the waxy molecules to lower molecular weight molecules. Other dewaxing processes may convert the wax contained in the hydrocarbon feed to the process by wax isomerization, to produce isomerized molecules that have a lower pour point than the non-isomerized molecular counterparts. As used herein, isomerization encompasses a hydroisomerization process, for using hydrogen in the isomerization of the wax molecules under catalytic hydroisomerization conditions.

Hydrodewaxing conditions generally depend on the feed used, the catalyst used, desired yield, and the desired properties of the base oil. Typical conditions include a temperature of from 500° F. to 775° F. (260° C. to 413° C.); a pressure of from 15 psig to 3000 psig (0.10 MPa to 20.68 MPa gauge); a LHSV of from 0.25 hr⁻¹ to 20 hr⁻¹; and a hydrogen to feed ratio of from 2000 SCF/bbl to 30,000 SCF/bbl (356 to 5340 m³ H₂/m³ feed). Generally, hydrogen will be separated from the product and recycled to the isomerization zone. Generally, dewaxing processes of the present invention are performed in the presence of hydrogen. Typically, the hydrogen to hydrocarbon ratio may be in a range from about 2000 to about 10,000 standard cubic feet H₂ per barrel hydrocarbon, and usually from about 2500 to about 5000 standard cubic feet H₂ per barrel hydrocarbon. The above conditions may apply to the hydrotreating conditions of the hydrotreating zone as well as to the hydroisomerization conditions of the first and second catalyst. Suitable dewaxing conditions and processes are described in, e.g., U.S. Pat. Nos. 5,135,638; 5,282,958; and 7,282,134.

The layered catalyst system generally includes a first catalyst comprising SSZ-91 and a second catalyst comprising SSZ-32X, arranged so that the feedstock contacts the SSZ-91 catalyst prior to contacting the SSZ-32X catalyst. The first and second catalysts may be contained in the same reactor or in separate reactors. Additional treatment steps and catalysts may be included, e.g., as noted hydrotreatment catalyst(s)/steps, guard layers, and/or hydrofinishing catalyst(s)/steps.

8

EXAMPLES

Example 1—Dewaxing Catalyst Preparation

Hydroisomerization catalyst A was prepared as follows: small crystallite SSZ-32x was composited with alumina to provide a mixture containing 45 wt. % zeolite, and the mixture was extruded, dried, and calcined according to conventional procedures (described in the patents cited herein). The dried and calcined extrudate was impregnated with a solution containing both platinum and magnesium. The overall platinum loading was 0.325 wt. %, and the magnesium loading was 2.5 wt. %.

Hydroisomerization catalyst B was prepared as described for Catalyst A to provide a mixture containing 65 wt. % SSZ-91. The dried and calcined extrudate was impregnated with platinum to give a platinum loading of 0.6 wt. %.

Example 2 (Comparative)—Catalyst a Only

The reaction was performed in a micro unit with the described configuration with Catalyst A and the run was operated under 2100 psig total pressure. Prior to the introduction of feed, the catalysts were activated by a standard reduction procedure (described in the patents cited herein). Then the feed (Feed 1) was passed through the hydrodewaxing reactor at a LHSV of 1.2. Feed I properties are listed in Table 1. The hydrogen to oil ratio was about 3000 scfb. The base oil product was separated from fuels through the distillation section. Pour point, cloud point, viscosity, viscosity index, simdist characteristics were analyzed on the products.

TABLE 1

| Feed I Properties | |
| --- | --- |
| Property | Value |
| API Gravity | 30 |
| Vis@100° C., cSt | 7.943 |
| Vis@70° C., cSt | 17.02 |
| N, ppm | 1 |
| S, ppm | 9 |
| SIMDIST TBP (Wt. %), ° C. (° F.) | |
| 0.5 | 265 (509) |
| 5 | 307 (585) |
| 10 | 330 (626) |
| 30 | 479 (895) |
| 50 | 507 (945) |
| 70 | 527 (981) |
| 90 | 552 (1026) |
| 95 | 566 (1051) |
| 99.5 | 593 (1100) |

Example 3 (Comparative)—Catalyst B Only

Example 3 was conducted according to the same conditions as Example 2 by using Catalyst B only rather than Catalyst A.

Example 4—Layered Catalyst B/Catalyst A

Example 4 was conducted according to the same conditions as Example 3 by using a layered catalyst system with 55 vol % Catalyst B on top and followed by 45 vol % Catalyst A. A comparison of results obtained for Examples 2-4 is shown in Table 2.

TABLE 2

| | Catalyst A | Catalyst B | Catalyst B/ Catalyst A layered system |
|---|---|---|---|
| Catalyst | | | |
| Activity, ° C. (° F.) | −47 (−53) | Base | −26 (−15) |
| Yield, wt. % | | | |
| 2 cSt | −0.9 | Base | −1.1 |
| 12 cSt | 0.9 | Base | 0.9 |
| 2 cSt properties | | | |
| Vis@40° C. | | 9.947 | 8.61 |
| Vis@100° C. | | 2.562 | 2.35 |
| Cloud point, ° C. | −28 | −32 | −34 |
| Pour point, ° C. | −44 | −44 | −48 |
| VI | 111 | 108 | 108 |
| Vis@40° C. | 95.21 | 102.1 | 94.6 |
| Vis@100° C. | 11.62 | 12.06 | 11.42 |
| Density, g/ml | 0.865 | 0.868 | 0.8677 |
| Cloud point, ° C. | 5 | −8 | −6 |
| Pour point, ° C. | −14 | −14 | −17 |

As shown in Table 2, the layered system maintained a high 12 cSt base oil yield as compared with the Catalyst A system with improved activity. More importantly, when reaching a similar pour point target on the 12 cSt product, the pour point of 2 cSt product was improved by 4° C., which is important to meet the low cold properties requirement(s).

Example 5

Example 5 was conducted according to the same conditions as Example 3 by using a layered catalyst system with 55 vol % Catalyst B on top and followed by 45 vol % Catalyst A to process the feed (Feed II) having properties shown in Table 3.

Results for base oil product production are shown in Table 4. As may be seen, when the pour point of the heavy product 10 cSt reached −16° C., the light base oil 4 cSt product achieves −40° C. pour point and −34° C. cloud point.

TABLE 3

| Feed II Properties | |
|---|---|
| Property | Value |
| API Gravity | 29.8 |
| Vis@100° C., cSt | 8.495 |
| Vis@70° C., cSt | 18.88 |
| N, ppm | 1.2 |
| S, ppm | 9 |
| SIMDIST TBP (Wt. %), ° C. (° F.) | |
| 0.5 | 306 (583) |
| 5 | 368 (694) |
| 10 | 397 (746) |
| 30 | 461 (862) |
| 50 | 494 (921) |
| 70 | 516 (961) |
| 90 | 540 (1004) |
| 95 | 551 (1023) |
| 99.5 | 579 (1074) |

TABLE 4

| Base Oil Product Properties | |
|---|---|
| | Value |
| Light Base Oil (80N) Product Properties | |
| VI | 79 |
| Vis@40° C., cSt | 19.53 |
| Vis@100° C., cSt | 3.856 |
| Cloud, ° C. | −34 |
| Pour, ° C. | −40 |
| SIMDIST (Wt. %), ° C. (° F.) | |
| 0.5/5 | 305/331 (581/628) |
| 10/30 | 342/368 (648/694) |
| /50 | 388 (730) |
| 70/90 | 406/429 (763/804) |
| 95/99.5 | 440/464 (824/867) |
| Heavy Base Oil (500N) Product Properties | |
| VI | 105 |
| Vis@40° C., cSt | 81.56 |
| Vis@100° C., cSt | 10.15 |
| API | 31.2 |
| Cloud Point, ° C. | −6 |
| Pour Point, ° C. | −16 |
| SIMDIST (Wt. %), ° C. (° F.) | |
| 0.5/5 | 372/414 (702/777) |
| 10/30 | 433/474 (811/885) |
| /50 | 498 (928) |
| 70/90 | 517/540 (963/1004) |
| 95/99.5 | 551/574 (1024/1065) |

Example 6

Example 6 was conducted according to the same conditions as Example 3 by using a layered catalyst system with 76 vol % Catalyst B on top and followed by 24 vol % Catalyst A to process the feed (Feed 111) having the properties shown in Table 5. When the pour point of the heavy product 8 cSt reached −19° C., the light base oil product 2 cSt reached −41° C. pour point and −34° C. cloud point.

TABLE 5

| Feed III properties | |
|---|---|
| Property | Value |
| API Gravity | 35.6 |
| Vis@100 C., cSt | 4.311 |
| Vis@70 C., cSt | 8.063 |
| N, ppm | <0.3 |
| S, ppm | <5 |
| SIMDIST TBP (Wt. %), ° C. (° F.) | |
| 0.5 | 300 (572) |
| 5 | 344 (651) |
| 10 | 361 (681) |
| 30 | 398 (748) |
| 50 | 423 (793) |
| 70 | 451 (844) |
| 90 | 496 (924) |
| 95 | 516 (960) |
| 99.5 | 557 (1034) |

TABLE 6

| Base Oil Product Properties | |
| --- | --- |
| Base Oil Product Property | Value |
| 2 cSt | |
| API Gravity | 37.5 |
| VI | 96 |
| Vis@100° C., cSt | 2.634 |
| Vis@40° C., cSt | 9.951 |
| Cloud Point, ° C. | −34 |
| Pour Point, ° C. | −41 |
| SIMDIST (Wt. %), ° C. (° F.) | |
| 0.5 | 286 (547) |
| 5 | 311(591) |
| 10 | 322 (612) |
| 30 | 349 (660) |
| 50 | 366 (690) |
| 70 | 381 (717) |
| 90 | 399 (751) |
| 95 | 407 (765) |
| 99.5 | 426 (799) |
| 4 cSt | |
| API Gravity | 36 |
| VI | 117 |
| Vis@100° C., cSt | 4.265 |
| Vis@40° C., cSt | 20.25 |
| Cloud Point, ° C. | −21 |
| Pour Point, ° C. | −25 |
| SIMDIST TBP (Wt. %), ° C. (° F.) | |
| 0.5 | 342 (647) |
| 5 | 369 (697) |
| 10 | 381 (718) |
| 30 | 405 (761) |
| 50 | 421 (789) |
| 70 | 436 (816) |
| 90 | 455 (851) |
| 95 | 463 (865) |
| 99.5 | 483 (902) |
| 8 cSt | |
| VI | 123 |
| Vis@100° C., cSt | 8.568 |
| Vis@40° C., cSt | 57.23 |
| Cloud Point, ° C. | −9 |
| Pour Point, ° C. | −19 |
| SIMDIST TBP (Wt. %), ° C. (° F.) | |
| 0.5 | 343 (813) |
| 5 | 453 (847) |
| 10 | 460 (860) |
| 20 | 469 (877) |
| 40 | 483 (902) |
| 60 | 497 (927) |
| 80 | 517 (962) |
| 95 | 544 (1012) |
| 99.5 | 578 (1072) |

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

The foregoing description of one or more embodiments of the invention is primarily for illustrative purposes, it being recognized that variations might be used which would still incorporate the essence of the invention. Reference should be made to the following claims in determining the scope of the invention.

For the purposes of U.S. patent practice, and in other patent offices where permitted, all patents and publications cited in the foregoing description of the invention are incorporated herein by reference to the extent that any information contained therein is consistent with and/or supplements the foregoing disclosure.

What is claimed is:

1. A hydroisomerization process, useful to make dewaxed products including base oils, the process comprising
   contacting a hydrocarbon feed with a first hydroisomerization catalyst under first hydroisomerization conditions to produce a first product;
   wherein, the first hydroisomerization catalyst comprises an SSZ-91 molecular sieve comprising at least one modifying metal selected from Groups 7 to 10 and 14 of the Periodic Table; and
   contacting the first product with a second hydroisomerization catalyst under second hydroisomerization conditions to produce a second product;
   wherein, the second hydroisomerization catalyst comprises an SSZ-32x molecular sieve comprising at least one modifying metal selected from Groups 7 to 10 and 14 of the Periodic Table.

2. The process of claim 1, wherein the first catalyst comprises a first Group 10 metal and, optionally, a second metal selected from Groups 7 to 10 and Group 14 metals of the Periodic Table.

3. The process of claim 2, wherein the first Group 10 metal of the first catalyst comprises Pt.

4. The process of claim 2, wherein the Groups 7 to 10 and Group 14 metal is selected from Pt, Pd, Ni, Re, Ru, Ir, Sn, or a combination thereof.

5. The process of claim 2, wherein the second Groups 7 to 10 and Group 14 metal is selected from Pd, Ni, Re, Ru, Ir, Sn, or a combination thereof.

6. The process of claim 1, wherein the SSZ-91 molecular sieve comprises ZSM-48 type zeolite material, the molecular sieve having:
   at least 70% polytype 6 of the total ZSM-48-type material;
   an EUO-type phase in an amount of between 0 and 3.5 percent by weight; and
   polycrystalline aggregate morphology comprising crystallites having an average aspect ratio of between 1 and 8.

7. The process of claim 6, wherein the SSZ-91 molecular sieve comprises:
   at least 80%, or 90%, polytype 6 of the total ZSM-48-type material;
   between 0.1 and 2 wt. % EU-1;
   crystallites having an average aspect ratio of between 1 and 5, or between 1 and 3;
   or a combination thereof.

8. The process of claim 1, wherein the modifying metals content for the first and/or second catalyst is 0.01-5.0 wt. % based on the total catalyst weight.

9. The process of claim 1, wherein the first and/or second catalyst comprises 0.01-1.0 wt. % Pt as one of the modifying metals and 0.01-1.5 wt. % of a second metal selected from Groups 7 to 10 and Group 14.

10. The process of claim 2, wherein the ratio of the first Group 10 metal to the optional second metal selected from Groups 7 to 10 and Group 14 is in the range of 10:1 to 1:5.

11. The process of claim 1, wherein the first catalyst comprises Pt as a Group 10 metal in an amount of 0.01-1.0 wt. % and a second metal selected from Pd, Ni, Re, Ru, Ir, Sn, or a combination thereof as a Groups 7 to 10 and Group 14 metal in an amount of 0.01-1.5 wt. %.

12. The process of claim 1, wherein the silicon oxide to aluminum oxide mole ratio of the SSZ-91 molecular sieve is in the range of 40 to 220.

13. The process of claim 1, wherein the first catalyst further comprises a matrix material selected from alumina, silica, titania or a combination thereof.

14. The process of claim 13, wherein the first catalyst comprises 0.01 to 5.0 wt. % of the modifying metal, 1 to 80 wt. % of the matrix material, and 0.1 to 99 wt. % of the SSZ-91 molecular sieve.

15. The process of claim 1, wherein the weight ratio of the first isomerization catalyst to the second isomerization catalyst is about 10:1 to 1:10.

16. The process of claim 1, wherein the hydrocarbon feed comprises gas oil; vacuum gas oil; long residue; vacuum residue; atmospheric distillate; heavy fuel; oil; wax and paraffin; used oil; deasphalted residue or crude; charges resulting from thermal or catalytic conversion processes; shale oil; cycle oil; animal and vegetable derived fats, oils and waxes; petroleum and slack wax; or a combination thereof, and/or wherein the hydrocarbon feed comprises a feed hydrocarbon cut in the distillation range from 400-1300° F. and/or wherein the hydrocarbon feed has a KV100 range from about 3 to 30 cSt.

17. The process of claim 1, wherein a base oil product having a reduced cloud point and/or pour point is produced.

18. The process of claim 1, wherein 50-90% of the feedstock is hydrodewaxed by the first catalyst.

19. The process of claim 18, wherein about 20% or greater of the feedstock is hydrodewaxed by the second catalyst.

20. The process of claim 1, further comprising contacting the feedstock under hydrotreating conditions with a hydrotreating catalyst prior to contacting the hydrocarbon feed with the first hydroisomerization catalyst, optionally, wherein the hydrotreating catalyst comprises a guard layer catalyst comprising a refractory inorganic oxide material containing about 0.1 to 1 wt. % Pt and about 0.2 to 1.5 wt. % Pd.

21. The process of claim 1, wherein the first and/or second products comprise one or more base oil products having a KV100 in the range of about 2 to 30 cSt.

22. The process of claim 21, wherein the base oil products comprise a base oil product having a pour point of not more than about −12° C., and a base oil product having a pour point of not more than about −35° C., and/or wherein the base oil products comprise a base oil product having a viscosity in the range of 6-26 cSt at 100° C. and a base oil product having a viscosity in the range of 1.5-5 cSt at 100° C.

* * * * *